(12) United States Patent
Brickell (10) Patent No.: US 6,240,478 B1
(45) Date of Patent: May 29, 2001

(54) APPARATUS AND METHOD FOR ADDRESSING ELECTRONIC MODULES

(75) Inventor: Christopher Gavin Brickell, Mukilteo, WA (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/183,887

(22) Filed: Oct. 30, 1998

(51) Int. Cl.[7] .............................. G06F 13/00; G06F 3/00
(52) U.S. Cl. ..................... 710/110; 710/101; 710/104; 710/109; 370/438
(58) Field of Search ................................ 710/101, 104, 710/109, 110; 370/438

(56) References Cited

U.S. PATENT DOCUMENTS

| | | | |
|---|---|---|---|
| 5,204,669 | 4/1993 | Dorfe et al. ................. | 240/825.52 |
| 5,262,771 | 11/1993 | Herrmann et al. ............. | 340/825.08 |
| 5,452,424 | * 9/1995 | Goeppel ..................... | 713/1 |
| 5,495,575 | 2/1996 | Hermann et al. .............. | 709/222 |
| 5,530,896 | 6/1996 | Gilbert ....................... | 710/9 |
| 5,586,269 | 12/1996 | Kubo ......................... | 340/825.52 |
| 5,590,374 | 12/1996 | Shariff et al. ................ | 710/9 |
| 5,914,957 | * 6/1999 | Dean et al. ................... | 370/438 |

* cited by examiner

Primary Examiner—Thomas Lee
Assistant Examiner—Tammara Peyton
(74) Attorney, Agent, or Firm—Marvin L. Union (57) ABSTRACT

A method and apparatus is described for addressing a plurality of interconnected electronic modules. One of the modules is initialized as a master module which sets its own internal address and broadcasts address information to each of the other modules during an addressing process. The other modules receive address information from the master module and set their internal addresses accordingly, such that each module has a unique internal address. The other modules also may broadcast information which may be received by the master module.

41 Claims, 5 Drawing Sheets

APPARATUS AND METHOD FOR ADDRESSING ELECTRONIC MODULES

TECHNICAL FIELD

The present invention is directed to an apparatus and method for establishing addresses for a plurality of interconnected electronic modules.

BACKGROUND OF THE INVENTION

An electronic module, such as may be arranged at a desired location in a manufacturing process, has an internal address which is used to communicate with the module. A module, for example, may be monitored to obtain information about the module or about the environment adjacent the module. Some information might indicate, for example, the presence or absence of an article at a particular location, such as on a conveyor belt assembly.

Typically, several electronic modules are utilized. Each module has an internal address which may be set during installation of the module. In conventional systems, the internal address of each module often is set manually, such as by manipulating one or more dip-switches. As a greater number of electronic modules are used or as a module is replaced or as new modules are added, the likelihood of address-related errors increases. Accordingly, it is desirable to provide an apparatus and method in which the internal address of each module may conveniently be set during an automatic addressing process.

U.S. Pat. No. 5,204,669 to Dorfe et al. discloses a method and apparatus for dynamically assigning addresses to a plurality of fully powered programmable function modules. This patent requires that a programmable controller initiate the addressing process by transmitting an enabling signal to a first function module over a control line. The programmable controller then transmits an address to the first module.

The process continues by the first function module obtaining and storing the address from the controller. The first function module internally modifies the address and then transmits an enable signal via a control line to another module. The enable signal notifies the next module that it may receive the modified address information. The first function module then transmits the modified address to the next module over the serial communications bus.

This process continues until the last module receives its address from an adjacent preceding module. The last module has a termination circuit which sends a return signal back to the controller over a second control line after the last module receives modified address information from a preceding module. In response to the return signal, the controller may determine information about the other modules.

The addressing scheme of the Dorfe et al. Patent requires a specially configured programmable controller to initiate the addressing process. Each function module also is fully powered and configured to modify and transmit addresses to downstream modules. In addition, a second control line is required to electrically connect the last module to the programmable controller for sending the return signal back to the controller.

U.S. Pat. Nos. 5,262,771 and 5,495,575 both to Hermann et al. disclose similar methods of self-addressing individual processor units connected in a network configuration. Similar to the Dorfe et al. patent, the individual processor units in each of these patents receive address information from a preceding adjacent processor unit. The processor unit then modifies the address information for subsequent transmission to the next connected processor unit or units. These systems, however, are more complex than that disclosed in the Dorfe et al. Patent. Specifically, the systems described in the Herrmann et al. patents have additional components for accommodating multiple branches of different processor units.

SUMMARY OF THE INVENTION

One aspect of the present invention is directed to an automatic addressing system that includes a plurality of interconnected electric modules. Each of the modules includes means for activating a next adjacent module. Each module may communicate with other of the modules over a communications bus. Each of the modules is activated upon receiving an activation signal. A first of the plurality of modules to be activated sets an internal address to a default value. The other modules set their respective internal addresses upon receiving address information from the first module over the communications bus.

Another aspect of the present invention is directed to a system for automatically addressing electronic modules. The system includes a first module which has a predetermined internal address. The first module is operable to broadcast address information which is different from the address of the first module. The system also includes a second module which has an internal address which it sets upon being activated and receiving address information from the first module. The second module also is operable to broadcast a predetermined message which is received by the first module. In preferred embodiments of the present invention, the predetermined message from the second module may correspond to either (i) an acknowledgement of receiving address information or (ii) a request for address information.

Yet another aspect of the present invention is directed to a method for addressing a plurality of serially connected electronic modules. Each of the modules is operable to communicate over a communications bus. A first of the plurality of modules is initialized as a master module having a predetermined internal address. The first module provides an activation signal to an adjacent one of the plurality of modules to activate the adjacent module. The first module broadcasts address information over the communications bus, which is received at the adjacent module. The adjacent module sets an internal address upon receiving the address information from the first module. Next, the adjacent module provides an activation signal, which is effective to activate a next adjacent module in the sequence of modules.

BRIEF DESCRIPTION OF THE DRAWINGS

The foregoing and other features of the invention will become more apparent to one skilled in the art upon consideration of the following description of the invention and the accompanying drawings in which.

DESCRIPTION OF PREFERRED EMBODIMENTS

Figure 1:
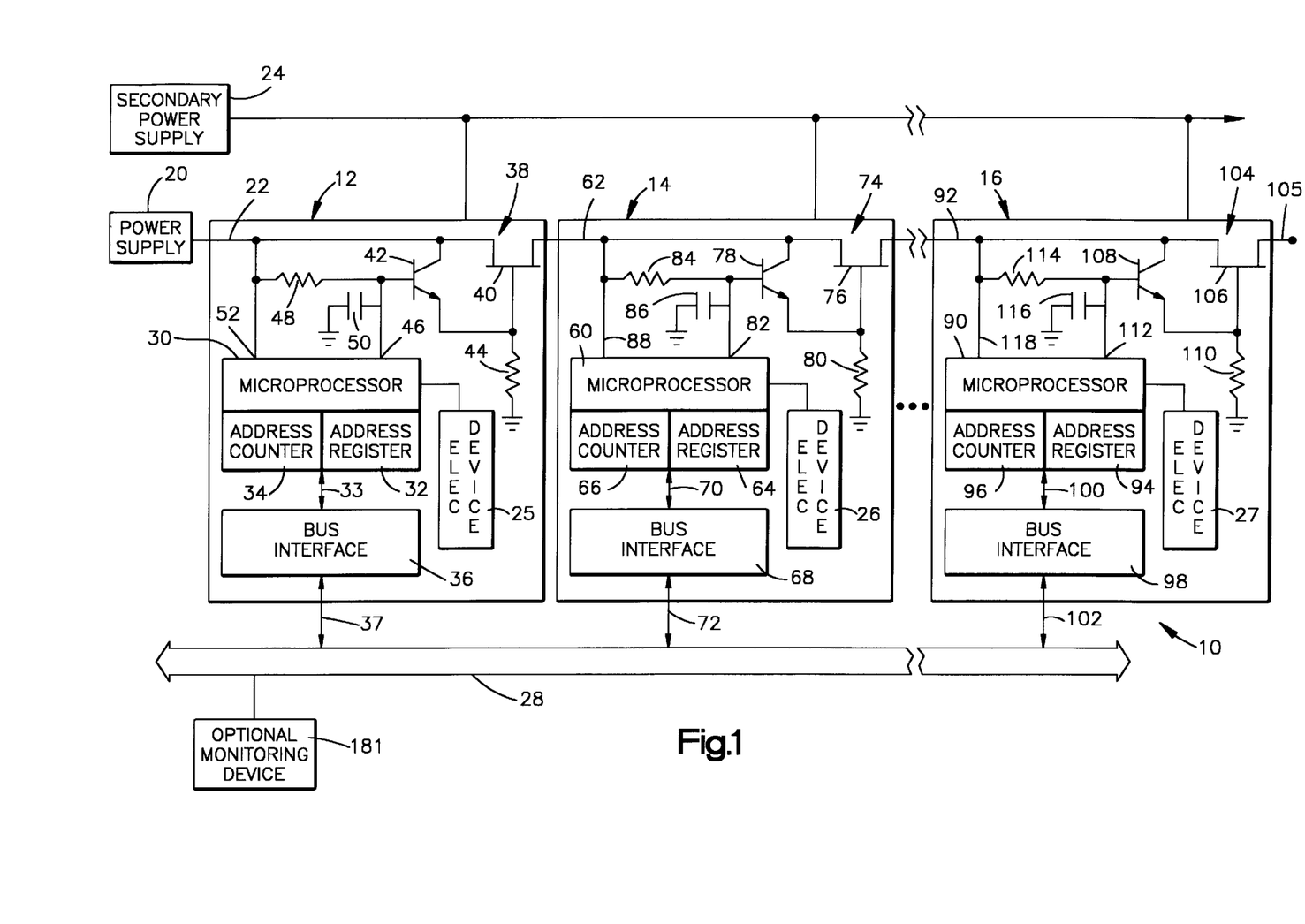
FIG. 1 is a schematic representation of a system in accordance with a first embodiment of the present invention.

FIG. 1 illustrates a first embodiment of a system 10 for automatically addressing a plurality of electronic modules 12, 14 and 16. Each of the modules 12, 14 and 16 are serially interconnected in a sequence from the first module 12 to the last module 16. It will be understood that, for simplification of illustration three modules 12, 14 and 16 are illustrated, although any number of modules may be utilized in accordance with the present invention. Preferably, each of these modules 12, 14 and 16 are substantially identically configured so as not to require differentiated treatment or programming of the interconnected modules.

In this embodiment, the module 12 is connectable to a power supply 20 through a power supply line 22. Each of the other modules 14 and 16 are connectable to the power supply 20 through activation of a preceding module. A secondary power supply 24 also may be connected to each of the modules 12, 14 and 16 to facilitate operation of the respective modules. For example, the secondary power supply 24 may supply electrical energy to electronic devices 25, 26 and 27, such as sensors or actuators, which are associated with each of the respective modules 12, 14 and 16.

The particular type of electronic devices 25, 26 or 27, which typically will be active during normal operation of the system, is selected according to the intended application. The devices 25, 26, and 27 may be any known type of sensing or actuating device. Each of the electronic devices 25, 26 and 27 may be the same type or different types of devices. While the electronic devices 25, 26 and 27 are illustrated as being located within the respective modules 12, 14 and 16, it will be understood that the devices could be external to the modules or that more than one device may be associated with each module. In one foreseeable application, the electronic devices 25, 26 and 27, for example, may be proximity sensors for detecting the presence or absence of an object within some predetermined distance of each respective module 12, 14 and 16.

The system 10 also preferably includes a common communications bus 28 over which each of the modules 12, 14 and 16 may communicate with each other. The communications bus 28 may be a wireless communications medium, such as, for example, where the modules 12, 14, and 16 communicate via electromagnetic energy, radio frequency signals, optical light rays or any other known wireless form of communication. Alternatively, the communications bus 28 may be in the form of a physical connection in communication with each of the modules 12, 14 and 16. For example, the physical connection may be an electrical conductor electrically connected with each respective module 12, 14 and 16. Accordingly, the bus could be the power supply line 22, or the line from the secondary power supply 24 or a fiber optic cable (not shown). Regardless of the communications medium, each of the modules 12, 14 and 16 may broadcast and receive information to and from the communications bus 28. To simplify this description, primary communications between modules is described as half duplex, although full duplex also may be used.

In this first embodiment, the first module 12 is directly connected with the power supply 20. Consequently, the first module 12 in the sequence of modules is activated first in the addressing process upon energization of the power supply 20 and thus is initialized as a master module.

The first module 12 includes a microprocessor 30 which manages the activities of the first module. The microprocessor 30 also is electrically connected to the power supply line 22 at an input 52. The microprocessor 30 may be any conventional microprocessor device, a plurality of discrete components, an application specific integrated circuit (ASIC) or a combination of various components arranged and configured for providing desired functions of the module 12. The microprocessor 30 has an associated address register 32, which stores address information for the first module 12. The microprocessor 30 also has an associated address counter 34, which may be utilized by the microprocessor during the addressing process, such as described below.

The microprocessor 30 of the module 12 also is electrically connected with a bus interface 36, which provides an interconnection between the first module 12 and the other modules 14 and 16 over the communications bus 28. The bus interface 36 is located at a junction between the microprocessor and the communications bus 28. The bus interface 36 may receive or send information signals 33 to and from the microprocessor 30. The bus interface 36 also may provide information signals 37 to be broadcast over the bus 28 according to the information signals 33 received from the microprocessor 30. Similarly, the bus interface 36 also may retrieve information signals 37 from the bus 28, which it properly formats and passes to the microprocessor 30 as the signals 33. It will be apparent to those skilled in the art that the bus interface 36 could also be part of the microprocessor 30.

The particular configuration of the bus interface 36 will depend upon the type of communications bus 28. For example, where the communications bus 28 is a wireless communication medium, the bus interface 36 may be in the form of a conventional transceiver, suitably configured for receiving and transmitting data signals 37 to and from the other modules 14 and 16. Alternatively, where the bus 28 is a physical connection, the bus interface 36 may be connected with the bus to facilitate data transfer between the microprocessor 30 and the bus 28. It will be apparent to those skilled in the art that details concerning the particular configuration of the bus interface 36 is beyond the scope of the present invention and that the bus interface 36 need only be configured to correspond to the type of communications bus 28 selected.

The microprocessor 30 of the first module 12 also includes means for activating the next adjacent module 14. In this preferred embodiment, the module 12 includes a switch circuit 38 which is operative to electrically connect the second module 14 to a source of electrical energy, such as the power supply 20. The switch circuit 38 is electrically connected with the microprocessor 30 and the power supply 20 through the supply line 22. The microprocessor 30 controls the switch circuit 38 to connect or disconnect the second module 14 electrically with the power supply 20. Completing the electrical connection between the second module 14 and the power supply 20 provides power to the second module to thereby effect its activation.

The switch circuit 38 includes a power switch 40, which may be bipolar junction transistor (BJT), a field effect transistor (FET), a contact relay or any other type of switch device. Preferably, the power switch 40 is a FET having a drain connected to power supply line 22 adjacent the power supply 20 and a source connected to the second module 14 over a second portion 62 of the power supply line 22. This provides a serial connection to the power supply 20 when the power transistor 40 is activated by the microprocessor 30.

The microprocessor 30 controls activation of the power transistor 40 through additional circuitry which is connected to the gate of the power transistor. A second transistor 42, preferably a BJT, has an emitter connected to the gate of the transistor 40. The gate of the transistor 40 also is connected to ground potential through a resistor 44. The second transistor 42 also has a collector connected to the power supply line 22 and a base connected to an output 46 of the microprocessor 30. The output 46 of the microprocessor 30 also is connected to an RC biasing network formed of a resistor 48 and a capacitor 50. The resistor 48 is connected between the base of the second transistor 42 and the power supply line 22 through a power input 52 of the microprocessor 30. The filtering capacitor 50 is connected between the microprocessor output 46 and ground potential.

The RC biasing network 48, 50 ensures that the transistor 42 is not turned on when power is initially applied. The microprocessor 30 requires a finite amount of time to begin operation of the program and complete its start-up processes whereupon the microprocessor output 46 is set to a low potential to ensure that switch 40 is in the off state. The delay provided by the RC biasing network 48, 50 ensures that the base of the transistor 42 does not reach a potential adequate to enable power to pass to the next module 14 through the switch 40 over the interval when the power is applied to line 22 and when the output 46 of the microprocessor 30 is set to a low potential.

Accordingly, when the microprocessor 30 provides a predetermined voltage level at the output 46, the second transistor 42 is activated to conduct current from the power supply line 22 through the resistor 44. This creates a positive voltage potential at the gate of the first transistor 40 which, in turn, activates the transistor 40 to conduct electrical energy from the power supply 20 to the second module 14.

Upon activation of the transistor switch 40, the second module 14 is activated and begins an initialization process substantially identical to that of the first module 12. The second module 14 also includes a microprocessor 60 which is electrically connected to the second portion 62 of the power supply line 22. The second portion 62 provides power to the microprocessor 60 upon the first module 12 activating the switch circuit 38 as described above.

The microprocessor 60, which may be substantially identical to that of the first module 12, manages the activities of the second module 14. The microprocessor 60 has an associated address register 64, which stores address information for the second module 14. The microprocessor 60 also has an associated address counter 66 which, under certain circumstances, may be utilized by the microprocessor during the addressing process.

The microprocessor 60 of the module 14 is electrically connected with a bus interface 68, which is located at the junction between the microprocessor and the communications bus 28. The bus interface 68 is substantially identical to that of the first module 12. The bus interface 68 provides and/or receives signals 70 to and from the microprocessor 60. The bus interface 68 also sends and receives information signals 72 which are broadcast over the communications bus 28.

As with the microprocessor 30 of the first module 12, the microprocessor 60 of the second module 14 also includes means for effecting activation of the next adjacent module, namely the module 16. Preferably, the module 14 includes a switch circuit 74, which is substantially identical to the switch circuit 38 described above. The circuit 74 is controlled by the microprocessor 60 to electrically connect the third module 16 to a source of electrical energy, such as the power supply 20, to thereby activate the third module.

As in the first module 12, the switch circuit 74 of the second module 14 preferably includes a power switch transistor 76 in the form a FET, which has a drain connected to power supply line portion 62 and a source connected to the third module 16. This connection provides a serial connection from the third module 16 to the power supply 20 when both power transistors 40 and 76 are activated.

The microprocessor 60 controls activation of the power transistor 76 by additional circuitry, which preferably is configured as described with respect to the first module 12. A second transistor 78, preferably a BJT, is connected between the second power supply line portion 62 and the gate of the transistor 76, which is connected to ground potential through a resistor 80. A base of the second transistor 78 is connected to an output 82 of the microprocessor 60, which controls activation of the second transistor 78. The output 82 of the microprocessor 60 also is connected to an RC biasing network formed of a resistor 84 and a filtering capacitor 86. The resistor 84 also is connected to a power input 88 of the microprocessor and the second power supply line portion 62.

As in the first module 12, the RC biasing network 84, 86 ensures that the transistor 78 is not turned on when power is initially applied, such as through activation by the first module 12. The microprocessor 60 requires a finite amount of time to begin operation of the program and complete its start-up processes, whereupon the microprocessor output 82 is set to a low potential to ensure that switch 76 is in the off state. The delay provided by the RC biasing network 84, 86 ensures that the base of the transistor 78 does not reach a potential adequate to enable power to pass to the next module 16 through the switch 76 over the time interval when power is applied to line 62 and when the microprocessor output 82 is set to a low potential.

Accordingly, when the microprocessor 60 provides a predetermined output signal at output 82, the second transistor 78 is activated to conduct current from the second portion 62 of the power supply line 22 through the resistor 80. This creates a positive voltage potential at the base of the first transistor 76 which, in turn, activates the transistor 76 to complete the electrical circuit from the power supply 20 to the third module 16.

Upon activation of the switch circuit 74, the third module 16 is activated and begins an initialization process substantially identical to that of the preceding modules 12 and 14.

In the example illustrated in FIG. 1, the module 16 is the last module in the sequence of modules. The module 16 also includes a microprocessor 90. The microprocessor 90, which may be substantially identical to that described with respect to the first and second modules 12 and 14, respectively, manages the activities of the third module 16. The microprocessor 90 is electrically connected to a third portion 92 of the power supply line 22. The third portion 92 conducts electrical power to the microprocessor 90 upon the first and second modules 12 activating their respective switch circuits 38 and 74 as described above.

The microprocessor 90 has an associated address register 94, which stores address information for the third module 16. The microprocessor 90 also has an associated address counter 96 which may be utilized by the microprocessor. It thus should be apparent to those skilled in the art that any module may be located at any position in the sequence of modules, as the modules preferably are substantially identical and will be initialized as a function of their spatial relationship in the sequence of modules. Of course, the electronic devices 25, 26 and 27 of each module 12, 14 and 16, respectively, may be either the same or different types of components.

The microprocessor 90 of the module 16 also is electrically connected with a bus interface 98, which is located at a junction between the microprocessor and the communications bus 28. The bus interface 98 is substantially identical to that of the first and second modules 12 and 14. The bus interface 98 sends and/or receives signals 100 to and from the microprocessor 90. The bus interface 98 also may send and receive information signals 102 which are broadcast over the communications bus 28.

The microprocessor 90 of the third module 16 also includes means for effecting activation of a next adjacent module, should another module be connected in the system 10. The module 16 thus includes a switch circuit 104, which is substantially identical to the switch circuits 38 and 74 described above. The circuit 104 is controlled by the microprocessor 90 to electrically connect an output 105 of the module 16 to a source of electrical energy, such as the power supply 20.

The switch circuit 104 preferably includes a power switch transistor 106 in the form a FET, which has a drain connected to the power supply line portion 92 and a source connected to the output 105 of third module 16. The switch circuit 104 thus serially connects the output 105 to the power supply 20 when all preceding switch circuits 38 and 74 are activated.

The microprocessor 90 controls activation of the power transistor 106 by additional circuitry which preferably is configured as described with respect to the other modules 12 and 14. A second transistor 108, preferably a BJT, is connected between the third portion 92 of the power supply line 22 and the gate of the transistor 106, which also is connected to ground potential through a resistor 110. A base of the second transistor 108 is connected to an output 112 of the microprocessor 90, which controls activation of the second transistor 108. The output 112 of the microprocessor 90 also is connected to an RC biasing network formed of a resistor 114 and a filtering capacitor 116.

The RC biasing network is substantially identical to the RC biasing networks 48, 50 and 84, 86 of the first and second modules 12 and 14, respectively. That is, the RC biasing network 114, 116 delays the turning on of the transistor 108 when power is initially applied to the power supply line portion 92. The delay provided by the RC biasing network 114, 116, in turn, ensures that the base of the transistor 108 does not reach a potential adequate to enable power to pass through the transistor switch 106 over the time interval when power is applied to line 92 and when the output 112 of the microprocessor 90 is set to a low potential.

Accordingly, when the microprocessor 90 provides a predetermined output signal at the output 112, the second transistor 108 is activated to conduct current from the second portion 92 of the power supply line 22 through the resistor 110. This creates a positive voltage potential at the gate of the first transistor 106 which, in turn, activates the transistor 106 to complete the electrical circuit from the power supply 20 to the output 105 of the last module 16.

The resistor 114 also is connected to a power input 118 of the microprocessor 90, which also is connected to the power supply portion 92.

Figure 2A:
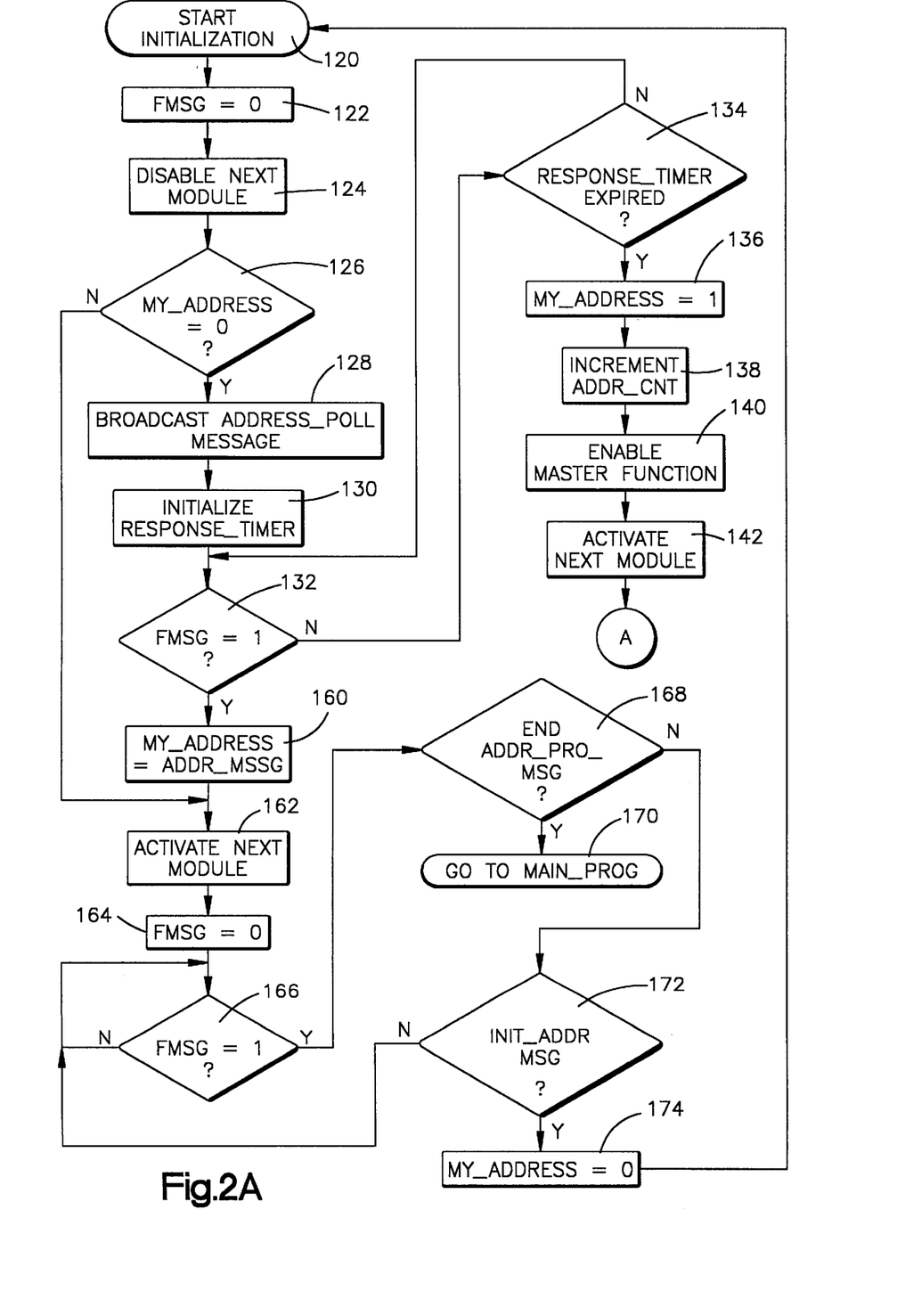
FIGS. 2A and FIG. 2B collectively are a flow diagram illustrating a preferred addressing process in accordance with the system illustrated in FIG. 1.
Figure 2B:
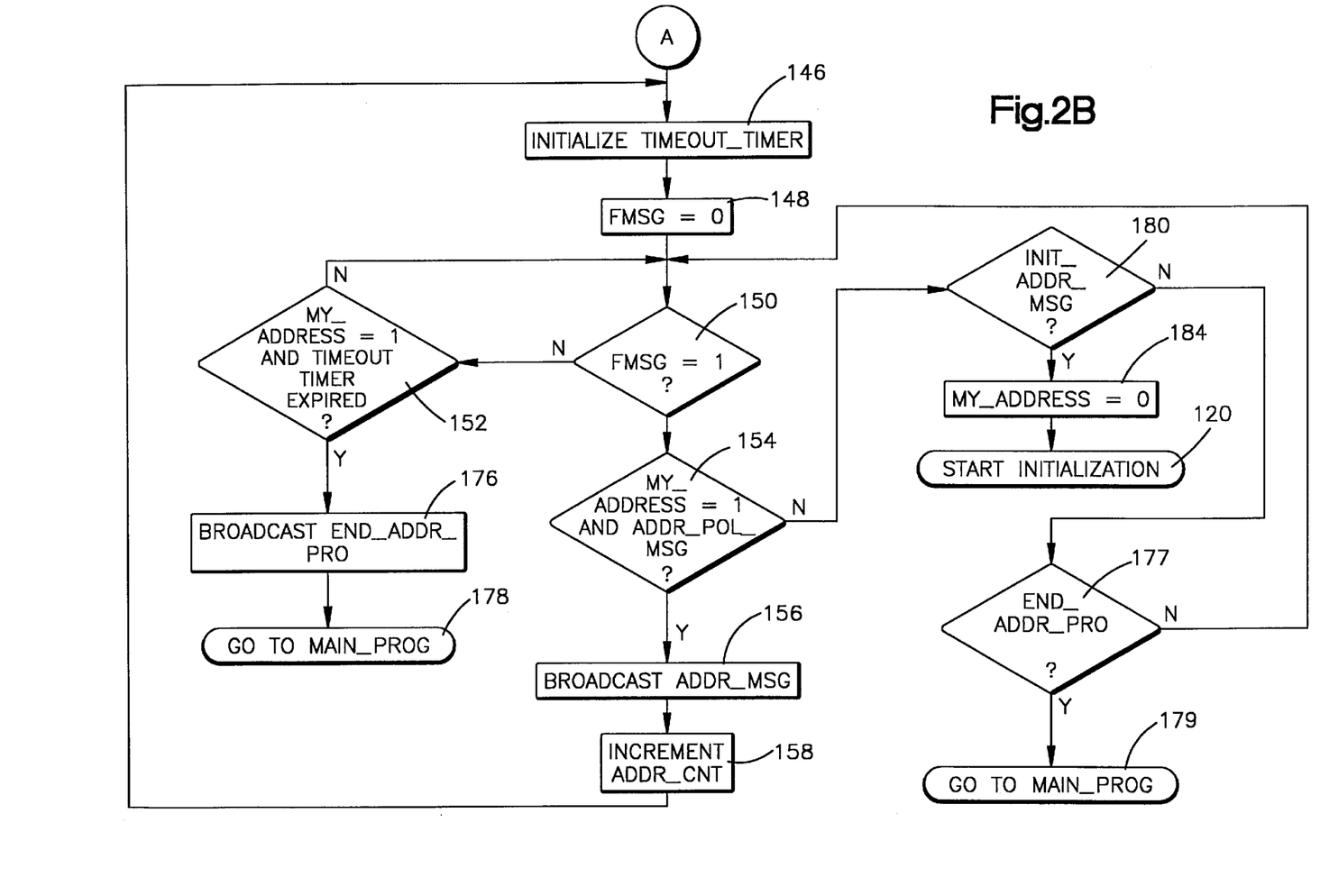

An addressing process for the system 10 may be better appreciated with reference to FIGS. 1, 2A and 2B. Upon energizing the power supply 20, the first module 12 begins an initialization process (120) which causes the microprocessor 30 of the first module 12 to initialize specified resources. Preferably, this includes clearing an internal message received flag (FMSG) (122) and disabling the next adjacent module 14 (124), such as through control of the switch circuit 38. Accordingly, at this point in the process, power cannot flow from the power supply 20 to any of the subsequent modules 14 or 16 in the sequence of modules.

The microprocessor 30 then determines (126) whether the module 12 has yet programmed its internal address (MY_ADDRESS), which is stored in the address register 32. The address registers 32, 64 and 94 of each of the respective modules 12, 14 and 16, for example, preferably are preprogrammed at the factory to have a predetermined default value, suitably as zero. During the addressing process, if the microprocessor 30 determines that the address register 32 has a MY_ADDRESS value equal to the default value, it broadcasts an ADDRESS_POLL message (128) over the common communications bus 28. The ADDRESS_POLL message is addressed for receipt by a master module, which in this preferred embodiment has an address MY_ADDRESS=1.

Upon sending the ADDRESS_POLL message, the microprocessor 30 of the module 12 initializes a RESPONSE_TIMER (130). The microprocessor 30 then waits for a response to its ADDRESS_POLL message to be broadcast over the communications bus 28. A typical response will contain address information based upon which the microprocessor 30 may set its internal address register 32. However, in this embodiment the module 12 is the first module to be initialized and it, therefore, will not receive a response to its ADDRESS_POLL message.

Preferably, the module 12 waits for a response by determining if its message received flag FMSG has been changed to indicate a response, such as FMSG=1 (132). If no response is received and so long as the RESPONSE_TIMER has not expired (134), the microprocessor 30 continues monitoring the bus 28, checking its FMSG for a received message (132) and determining whether the RESPONSE_TIMER has expired (134).

In this embodiment, because the module 12 is the first module adjacent the power supply 20, the RESPONSE_TIMER will expire before a response to its ADDRESS_POLL message is received. This is because, as stated above, each of the other modules 14 and 16 are deactivated and, consequently, cannot respond. Accordingly, the module 12 will become the master module and set its address register to a predetermined master default value, such as setting MY_ADDRESS=1 (136). The microprocessor 30 then increments an ADDR_CNT value of its address counter 34 (138) and enables a mastership function flag (140) of the module 12. Upon setting the module 12 as the master module (140), the microprocessor 30 provides an activation signal at the output 46 to activate the switch circuit 38 (142). This provides electrical energy to the microprocessor 60 of the second module 14, thereby activating the next adjacent module, namely the second module 14.

As shown in FIG. 2B, the first module 12 then enters a wait-for-mode in which it initializes a TIMEOUT_TIMER function (146) and sets its FMSG=0. The TIMEOUT_TIMER function is a timer which, for example, decrements from a predetermined value to zero, suitably taking about 5 seconds. During this time period, the microprocessor 30 monitors the communications bus 28 for various information (150), including an ADDRESS_POLL message broadcast from one of the other modules 14 or 16 in the system 10.

Upon being activated by the first module 12, the second module 14 begins the initialization process at step (120). The microprocessor 60 of second module 14 thus clears its message received flag FMSG=0 (122) and disables the next adjacent module 16 (124) in the sequence of modules by deactivating the switch circuit 74.

Assuming that the second module 14 has not already received an address value different from the default address value, such as during a previous addressing process, the microprocessor 60 of the second module determines if its address is equal to the default value, namely MY_ADDRESS=0. Because in this example, the second module 14 has not yet received an address value, the microprocessor 60 sends an ADDRESS_POLL message (128) to its bus interface 68 which is broadcast over the common communications bus 28 and addressed to the master module address.

Upon sending the ADDRESS_POLL message, the microprocessor 60 of the second module 14 initializes a RESPONSE_TIMER (130). As with the previous module 12, the microprocessor 60 of the second module 14 decrements the RESPONSE_TIMER from some predetermined value to zero, as it waits for a response to its ADDRESS_POLL message.

Because, the first module 12 has been established as the master module, which has a predetermined internal address, suitably MY_ADDRESS=1, it is able to receive the ADDRESS_POLL message from the second module 14. Thus, as the TIMEOUT_TIMER counts to zero, the microprocessor 30 of the module 12 performs a loop, during which it determines if it has received a message from the communications bus 28 (150). If its FMSG is not set equal to one, the microprocessor 30 determines if the TIMEOUT_TIMER has expired (152).

Assuming that the first module 12 receives a message prior to the TIMEOUT_TIMER expiring, i.e., FMSG=1, the first module then determines the type of message being received. For example, if the first module has MY_ADDRESS=1 and receives an ADDRESS_POLL message (154), the first module 12 broadcasts address information, such as by sending an address message signal 33 (ADDR_MSG) to the bus interface 36. The bus interface 36 sends the address information signal 37 for broadcasting over the common communications bus 28 (156). Preferably, the address message ADDR_MSG includes the current value of the address counter 34 ADDR_CNT.

Upon sending the address information, the first module 12 also increments its internal address counter 34 ADDR_CNT to a next predetermined value (158). For example, the address counter 34 may be modified in increments of one upon each occurrence of broadcasting new address information over the bus 28. Alternatively, other address schemes also may be used. For example, a look-up table may be used to obtain the next address information or an address generating algorithm may provide the address information. The addresses also may be random or nonsequential.

Upon broadcasting the address information (156) and incrementing its address counter 34 (158), the microprocessor 30 of the first module 12 returns to step 146. Thus, the microprocessor initializes the TIMEOUT_TIMER (146) and clears its message received flag FMSG (148) to await another message during the addressing process.

Referring back to FIG. 2A, in response to its ADDRESS_POLL message, the microprocessor 60 of the second module 14 receives the address information from the bus 28, including the ADDR_MSG broadcast by the first module 12. This conveniently may be indicated by its message received flag FMSG function changing conditions, such as to FMSG=1 (132). The microprocessor 60 then sets its internal address register 64 MY_ADDRESSESS to a value which is a function of the address information ADDR_MSG broadcast by the first module 12, suitably setting MY_ADDRESS=ADDR_MSG (160).

Upon setting its internal address register 64, the microprocessor 60 then provides an activation signal at the output 82. This activates the switch circuit 74, thereby activating the next adjacent module 16 (162). The second module 14 also clears its message received flag (FMSG=0) (164), so as to await another message. For example, the second module 14 may receive a message END_ADDR_PRO instructing it to terminate the addressing process (168) and begin the main part of its program (170). Alternatively, the module 14 may receive a message INIT_ADDR to once again initiate the addressing process (172). An INIT_ADDR message also may cause each module to reset their respective addresses to a default value, such as setting MY_ADDRESS=0 (174).

This process will continue until the last module 16 in the sequence of modules is activated and receives appropriate address information from the first module 12. After the last module 16 has set its internal address register 94 according to the received the address information, the TIMEOUT_TIMER of the first module 12 will expire (152). The microprocessor 30 of the first module 12 will then broadcast a termination message END_ADDR_PRO (176) over the communications bus 28 to the slave modules 14 and 16 in the sequence instructing them to end the addressing process at step (168). This results in each of the modules 12, 14, and 16 terminating the addressing process and going to the normal operating portion of their respective programming MAIN_PROG (170, 178).

While during the addressing process the first module 12 to be activated acts as the master module providing address information to each of the other modules which operate as slave modules, an optional monitoring device 181 also may be connected with the common communications bus 28. The optional device 181 may monitor the modules 12, 14 and 16 and/or provide various commands to each of the modules 12, 14 and 16.

The optional monitoring device 181 may, for example, broadcast an INIT_ADDR message (172, 180) to the master module 12 or to all the modules 12, 14 and 16. The INIT_ADDR message may instruct the modules 12, 14 and 16 to clear their own internal addresses MY_ADDRESSESS=0 (174, 184) and to initiate the addressing process (120). Each module 12, 14 and 16 will then control its respective switch circuits 38, 74 and 104 to deactivate or disable each adjacent downstream module during its own initialization. The first module 12, which is connected directly to the power supply 20, will initially be the only active module and proceed with the addressing process as described above.

An example of suitable pseudocode corresponding to the addressing process of FIGS. 2A and 2B is attached hereto as Appendix A.

Figure 3:
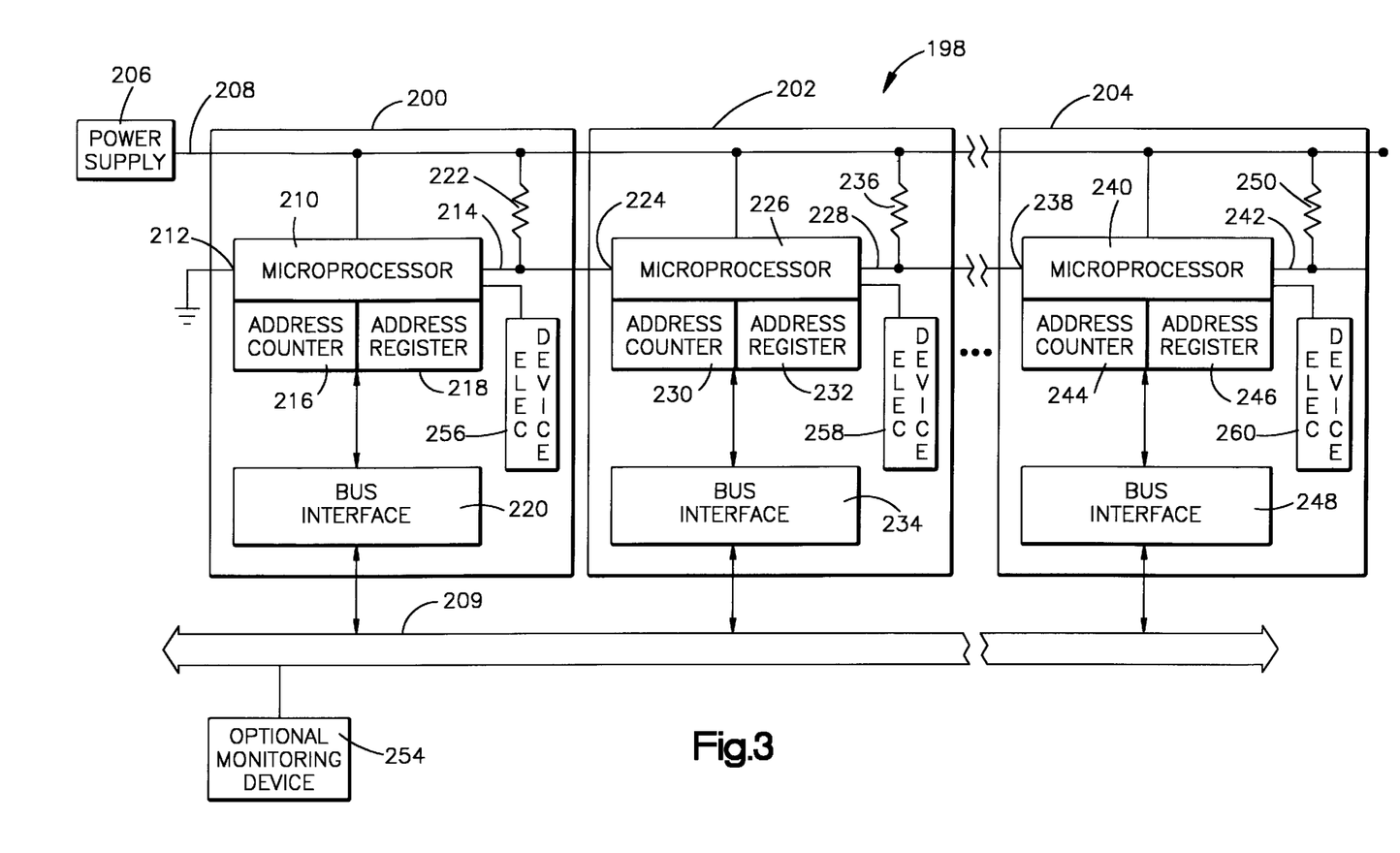
FIG. 3 is a schematic representation of a system in accordance with a second embodiment of the present invention.

FIG. 3 illustrates a second embodiment of the addressing system 198 in accordance with the present invention. A plurality of electronic modules 200, 202 and 204 are serially interconnected in a sequence from the first module 200 to the last module 204. For simplification of explanation only three modules 200, 202 and 204 are illustrated. It will be understood and appreciated that any number of modules may be used in accordance with the system 198 of the present invention.

Each of the modules 200, 202 and 204 is connected to a power supply 206, which provides electrical energy to each of the modules 200, 202 and 204 over a common power supply line 208. Each of the modules 200, 202 and 204 also may communicate with the other modules over a common communications bus 209, which is substantially identical to the bus 28 described above.

The first module 200 includes a microprocessor 210 for managing activities of the module. The microprocessor 210 is electrically connected with the power supply line 208. The microprocessor 210 also includes an input 212 for receiving an activation signal for effecting activation of the first module 200. In this example, the input 212 is connected to an electrical ground potential or a digital LOW. The microprocessor 210 also includes an output 214 electrically connected with the next adjacent module 202 in the sequence of modules. The microprocessor 210 may provide a signal at its the output 214 to thereby effect activation or deactivation of the next module 202 in the sequence of modules.

The module 200 also includes an address counter 216 and an internal address register 218, either of which may be part of the microprocessor 210 or separate memory devices. Preferably, the address counter 216 and the address register 218 are in the form of non-volatile data memory for storing address information. The module 200 also includes a bus interface 220, such as was described above with respect to the embodiment of FIG. 1.

The output 214 of the microprocessor 210 is electrically connected with an input 224 of a microprocessor 226 of the next adjacent module 202. The output 214 also is connected to the power supply line 208 through a resistor 222. Upon the microprocessor 210 providing an activation signal at a predetermined voltage level, suitably about zero volts or a digital LOW, the microprocessor 226 is activated and thus can begin the addressing process for the second module 202.

The module 202 preferably is substantially identical to the module 200 described above, with its microprocessor 226 managing the activities of the module. The microprocessor 226 is electrically connected with the power supply line 208. The microprocessor 226 also includes an output 228 electrically connected with a next adjacent module in the sequence of modules, such as the module 204. During the addressing process, the microprocessor 226 may provide a signal at its the output 228 to thereby effect activation or deactivation of the next module 204. The output 228 also is connected to the power supply line 208 through a resistor 236.

The module 202 includes an address counter 230 and an internal address register 232, which preferably are in the form of non-volatile data memory. The module 202 also includes a bus interface 234, such as described above, which provides for communication with the other modules 200 and 204 in the system 198.

Upon the microprocessor 226 providing an activation signal at its output 228, the next adjacent module 204 in the sequence of modules is activated. In the embodiment of FIG. 3, the module 204 is the last module in the sequence of modules, although any number of modules may be used. It will be appreciated that, because each of the modules is substantially identical, any module could be positioned at any location in the sequence of modules. Accordingly, additional modules may be added to the sequence at any location at any time through simple connections.

The last module 204 includes a microprocessor 240, which manages the activities of the module, including the addressing process. The microprocessor 240 is electrically connected with the power supply line 208. The microprocessor 240 of the last module 204 includes an input 238 which is electrically connected to the output 228 of the preceding adjacent module 202. The microprocessor 240 also includes an output 242 which is connectable to another module, which may be added to the sequence of modules. The output 242 preferably also is connected to the power supply line 208 through a resistor 250.

The module 204 also includes an address counter 244 and an internal address register 246, which preferably are in the form of non-volatile data memory. The module 204 also includes a bus interface 248, such as described above.

Even though no module is connected to the output 242 of the last module 204, the microprocessor 240 preferably still provides a predetermined activation signal at its output upon successfully setting its internal address register 246. The effect of having no module connected to its output during the addressing process is described below.

As described with respect to the embodiment of FIG. 1, an optional monitoring device 254 also may be connected with the common communications bus 209. The optional device 254 may monitor each of the modules 200, 202 and 204 of the system 198 as well as provide various commands to the modules. Each of the modules 200, 202 and 204 also may include an electrical device 256, 258 and 260, respectively, such as sensors and/or actuators as described above. The specifics of the electrical devices 256, 258 and 260 are selected based upon the desired application for each respective module 200, 202 and 204. Such electrical devices 256, 258 and 260, for example, may be configured to monitor or effect changes in the conditions of the respective modules 200, 202 and 204 or the environments where they are located in the system 198. The monitoring device 254, for example, may provide a central station through which a user may monitor or control various aspects of modules, including the electrical devices 256, 258 and 260.

Figure 4:
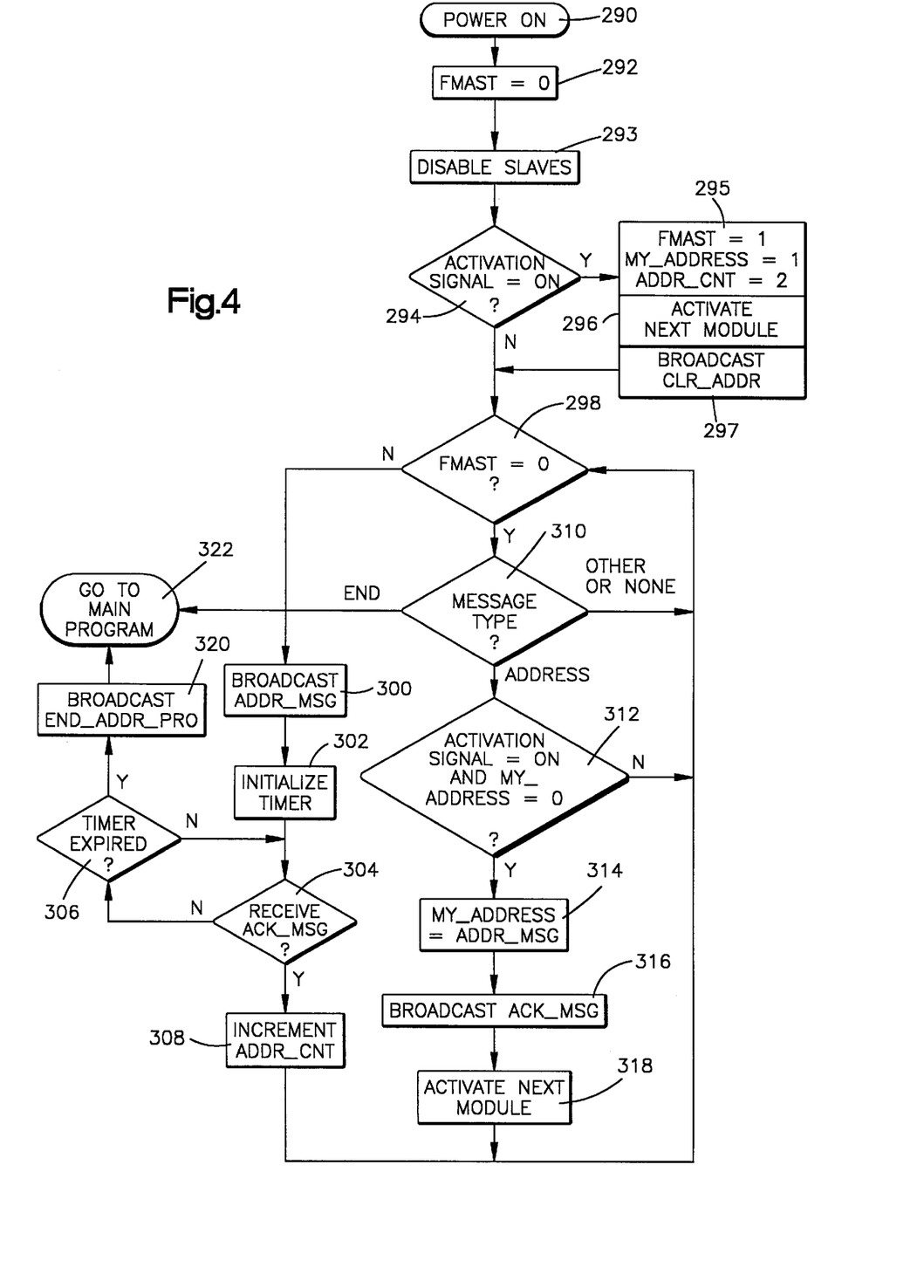
FIG. 4 is a flow diagram illustrating a preferred addressing process in accordance with the system illustrated in FIG. 3.

In view of the preferred system 198 illustrated in FIG. 3, its operation may be better appreciated with reference to FIG. 4. The process begins with the modules 200, 202 and 204 initially being in an un-powered state, such as the power supply 206 providing no electrical energy over the supply line 208. Upon application of power (290) by the power supply 206 to each of the modules 200, 202 and 204, specified resources of each microprocessor 210, 226 and 240 are initialized. This may include clearing a master ship flag (292) (FMAST), which indicates if a module has assumed a role as the master module.

Each of the slave modules 202 and 204 also are deactivated (293) during the initialization period, such as by each microprocessor 210, 226 and 240 effecting deactivation of each next adjacent module in the sequence of modules. This may be done by each microprocessor 210, 226 and 240 providing a deactivation signal at its respective output 214, 228 and 242. For example, the activation signal may correspond to a logic zero output, whereas the deactivation signal is logic one. Other combinations of signals also may be used.

Preferably, the input 212 of the microprocessor 210 of the first module 200 is electrically connected to a predetermined voltage level which corresponds to an activation signal. In this example, the input 212 is electrically connected to an electrical ground potential. Accordingly, the first module 200 is designated as the master module through a simple hardwire connection of its input 212 to the ground potential, which corresponds to an activation signal. It will be understood and appreciated that other approaches may be used to apply the activation signal to the input of the first module 200.

During the addressing process, the module 200 determines if its input is receives an activation signal to effect its activation (294). Because the input 212 of the microprocessor 210 is electrically grounded during the initial power ON phase, the microprocessor 210 is established as the master module. The other modules 202 and 204 thus operate as slave modules. It will be appreciated by those skilled in the art that the role of each module in the addressing process, i.e. whether it is a slave or the master, is a function of the spatial relationship of each module in the sequence in which the modules are interconnected. Each module, thus, is capable of being both a master and a slave module.

Because the module 200 is first in the sequence of modules, the microprocessor 210 of the module 200 sets its mastership flag FMAST to indicate that it is assuming the role of the master module, such as by setting FMAST=1 (295). The microprocessor 210 also set its internal address register 218 to a predetermined value indicative of the master module, such as setting MY_ADDRESS=1. The microprocessor 210 increments the address counter 216 to the next available address value, such as setting ADDR_CNT=2.

The master module 200 provides an activation signal on its output 214 to thereby activate or enable the next module 202 (296). The microprocessor 210 of the first module 200 also preferably broadcasts a message CLR_ADDR (297) over the common communications bus 209 instructing each of the slave modules 202 and 204 to clear their respective internal address registers 232 and 246 to a predetermined default value, such as each setting its MY_ADDRESS=0. This enables each of the other modules 202 and 204 in the system 198 to receive information addressed to the default value upon being activated by a preceding module as well as ensures they will operate as slave modules during the addressing process.

The process continues by the microprocessor 210 of the first module 200 determining that it has assumed the role as the master module (298). Upon being established as the master module, the microprocessor 210 broadcasts address information including an address message ADDR_MSG (300) over the communications bus 209. The address message ADDR_MSG suitably is addressed to the default value. The address information preferably corresponds to the address count value ADDR_CNT which is stored in the address counter 216. Because the module 202 is the only activated module having an internal address set to the default value, it receives the address information broadcast from the first module 200.

It will be apparent that other address schemes also may be used. The addresses may be sequential, non-sequential or random. For example, a look-up table may be used to obtain the next address information. Alternatively, an address generating algorithm may provide the address information which is broadcast. A simple approach is to set each slave module successively with incremental addresses broadcast from the master module. The individual modules also may be programmed to derive unique internal address based upon the address information received from the communications bus 209.

The microprocessor 210 initializes a timer (302) upon broadcasting the address information. The timer counts down from a predetermined value to zero, such as about five seconds. As the timer counts down, the microprocessor 210 of the first module monitors the bus 209 for an acknowledgement message ACK_MSG (304). The acknowledgement message ACK_MSG indicates that the previously broadcast address information has been received by another module in the system. If no acknowledgement message ACK_MSG is received, the microprocessor 210 determines if the timer has expired (306). If the timer has not expired, the microprocessor 210 continues monitoring the bus 209 for an acknowledgement ACK_MSG.

Upon receiving an acknowledgement ACK_MSG, the microprocessor 210 increments the address counter 216 (308) to the next available address value. The microprocessor 210 then returns to step 298. Because the module 200 is the master module with its FMAST=1, the microprocessor 210 sends another address message ADDR_MSG(300). The address message suitably includes the ADDR_CNT value of the address counter 216.

The microprocessor 226 of the second module 202 receives the activation signal, preferably about zero volts, at its input 224 from the output 214 of the microprocessor 210 during step (296). As described above, the module 202 already has been initialized in the power on step (290). The address value MY_ADDRESS of the address register 232 has already been set to the default value, suitably zero, in response to the CLR_ADDR message (297) from the first module 200. The microprocessor 226 also has set the mastership flag to FMAST=0 in step (292) designating the module 202 as a slave module.

Accordingly, upon being activated in step (296), the microprocessor 226 determines it has been designated as a slave module (298), as its mastership flag FMAST=0. The microprocessor 226 then receives messages (310) from the communications bus 209, including those addressed to the default value. The microprocessor 226 may be responsive to different types of messages. For example, it may receive a message instructing it to begin its main program (322) or to an address message containing unique address information.

Upon receiving an address message while the input 224 of the microprocessor 226 is receiving an activation signal, e.g. ACTIVATION SIGNAL=ON and MY ADDRESS=0 (312), the microprocessor 226 sets its internal address register 232. Preferably, the MY_ADDRESS value of the address register 232 is set to a value which is a function of the address information ADDR_MSG received from the first module 200, such as by setting MY_ADDRESS=ADDR_MSG (314).

Upon setting its internal address register 232, the microprocessor 226 of the second module 202 sends an acknowledgement message ACK_MSG (316) to the bus interface 234 which is broadcast over the common communications bus 209. Next, the microprocessor 226 of the second module 202 provides an activation signal at its output 228 to activate the next adjacent module 204 (318) in the sequence of modules. The second module 202 then monitors the bus 209 for a message instructing it to terminate the addressing process.

It is to be understood that the activation and addressing of the each of the slave modules 202 and 204 is to be performed within the time allotted for the timer of the microprocessor 210 of the first module 200. Accordingly, the acknowledgement message ACK_MSG broadcast by the second module 202 in step (316) should be received by the microprocessor 210 (304) of the first module 200 from the communications bus 209 prior to the expiration of the timer. The microprocessor 210 increments its associated address counter 216 (308) to the next available address value upon receiving the acknowledgement message ACK_MSG in step (304).

Because the microprocessor 226 of the second module 202 provides an activation signal at its output 228 to the next adjacent module 204 (318) in the sequence of modules, the next address information ADDR_MSG broadcast by the microprocessor 210 of the first module 200 will be received by the module 204 which is activated by the module 202.

The addressing process repeats for each sequential module in the system 198 until the last module, which in this example is module 204, receives address information ADDR_MSG from the bus 209 and programs its address register 246 accordingly. The last module 204, as with the preceding slave modules, sends an acknowledgement message ACK_MSG (316) over the common communications bus 209 upon setting its internal address register 246. The microprocessor 210 of the first module 200 receives the acknowledgement message ACK_MSG (304) from the last module 204 and increments its ADDR_CNT value of the address counter 216 (308).

The first module 200 at this point is unaware that the module 204 is the last module. Accordingly, the first module 200 proceeds to broadcast another unique address message ADDR_MSG (300), which preferably includes the ADDR_CNT value. The module 200 also initializes its timer (302). Because the module 204 is the last module in the sequence of modules, there is no "next" module which is able to be activated and receive the address information ADDR_MSG broadcast by the microprocessor 210 of the first module 200. Consequently, the timer expires.

Upon expiration of the timer, the microprocessor 210 broadcasts a message END_ADDR_PRO (320), instructing each of the modules in the sequence to terminate the addressing process. The microprocessors 210, 226 and 240 of the modules 200, 202 and 204, respectively, go to their main programs (322).

An example of suitable pseudocode corresponding to the addressing process of FIG. 4 is attached hereto as Appendix B.

In view of the foregoing description of two possible embodiments, it will be apparent to those skilled in the art that the present invention advantageously may utilize standardized electronic modules which require almost no differentiated treatment, other than a few simple physical connections. Once the addressing process is complete, the master module (12, 200) or an optional monitoring device (181, 254) may communicate with any of the modules (12, 14, 16; 200, 202, 204), either individually or collectively. The normal operation and the particular communication protocols employed are beyond the scope of the present invention, as many approaches are suitable.

In addition, communication algorithms may be utilized by the modules to communicate with other modules, which may be located upstream or downstream in the sequence. In the normal operating mode, the system may operate as a master-slave system or as a peer-to-peer network. While each of the modules preferably is connected to a common communications bus (28, 209), and thus may receive each message which is broadcast, only the module or modules with an address corresponding to the implicit address range contained in a particular message will act on the message content. Therefore, the present invention provides a beneficial way to provide each module with a unique address.

It will also be appreciated that the addressing process may be utilized during an initial installation process as well as when modules are being replaced. Advantageously, because each module has a unique address, individual modules may be identified for diagnosis or test purposes, such as by the optional monitoring device (181, 254). The addressing process also provides a convenient approach for monitoring the electrical devices (25, 26, 27; 256, 258, 260) within each module (12, 14, 16; 200, 202, 204).

In view of the foregoing description, it will be appreciated that one aspect of the present invention is directed to an automatic addressing system 10 or 198 that includes a plurality of interconnected electric modules 12, 14 and 16 or 200, 202 and 204. Each of the modules 12, 14 and 16 or 200, 202 and 204 includes means for activating a next adjacent module. Each of the modules may communicate with other of the modules over a communications bus 28 or 209. Each of the modules 12, 14 and 16 or 200, 202 and 204 is activated upon receiving an activation signal at a respective input 52, 88 and 118 or 212, 224 and 238. A first module 12 or 200 to be activated sets an internal address to a default value. The other modules 14 and 16 or 202 and 204 set their respective internal addresses upon receiving address information from this first module 12 or 200 over the communications bus 28 or 209.

Another aspect of the present invention is directed to a system 10 or 198 for addressing electronic modules. The system includes a first module 12 or 200 which has a predetermined internal address. The first module 12 or 200 is operable to broadcast address information which is different from the internal address of the first module. The system 10 or 198 also includes a second module 14 or 202 having an internal address which it sets upon being activated and receiving address information from the first module 12 or 200. The second module 14 or 202 also is operable to broadcast a predetermined message which is received by the first module. In preferred embodiments of the present invention, the predetermined message from the second module may correspond to either (i) an acknowledgement of receiving address information or (ii) a request for address information.

Yet another aspect of the present invention is directed to a method for addressing a plurality of serially connected electronic modules. Each of the modules is operable to communicate over a communications bus. A first of the plurality of modules is initialized as a master module (140 or 295) having a predetermined internal address. The first module provides an activation signal (142 or 296) to an adjacent one of the plurality of modules to activate the adjacent module. The first module broadcasts address information (156 or 300) over the communications bus, which is received at the adjacent module. The adjacent module sets an internal address (160 or 314) upon receiving the address information from the first module. Next, the adjacent module provides an activation signal (162 or 318), which is effective to activate a next adjacent module in the sequence of modules.

From the above description of the invention, those skilled in the art will perceive improvements, changes and modifications. Such improvements, changes and modifications within the skill of the art are intended to be covered by the appended claims.

What is claimed is:

1. An automatic addressing system comprising: a plurality of interconnected electronic modules;
   each module of said plurality of modules including a controller having means for electricity activating a next adjacent module, and a memory storage device in electrical communication with said controller; and
   a communications bus over which said controller of each module of said plurality of modules may communicate directly with controllers of other modules of said plurality of modules, each of said plurality of modules being activated upon receiving an activation signal, a first module of said plurality of modules setting an internal address to first default value, each of the other modules of said plurality of modules setting an internal address upon receiving unique address information from said first module via said communications bus;

wherein each one of the other modules of said plurality of modules broadcasts an address polling message upon being activated, said first module broadcasts unique address information over said communications bus in response to said first module receiving an address polling message from one of the other modules of said plurality of modules.

2. A system as set forth in claim 1 wherein said plurality of modules are serially interconnected in a sequence which is a function of their spatial relationship to each other, each controller of said plurality of modules further includes means for providing an electrical signal to effect activation of a next adjacent module in the sequence in which said plurality of modules are interconnected.

3. A system as set forth in claim 2 wherein each one of said modules of said plurality of modules includes a switch electrically connected with said controller of said one module, said controller of said one module being operable to control said switch of said one module to provide electrical energy to a next adjacent module in the sequence in which said plurality of modules are interconnected to thereby effect activation of the next adjacent module in the sequence in which said plurality of modules are interconnected.

4. A system as set forth in claim 2 wherein said means for providing an electrical signal includes an electrical conductor and which conducts the electrical signal to the next adjacent module in the sequence in which said plurality of modules are interconnected to thereby effect a change in condition of next the adjacent module between active and inactive conditions.

5. A system as set forth in claim 1 wherein said communications bus includes a wireless communication medium for communication between said plurality of modules occurs.

6. A system as set forth in claim 1 wherein said communications bus includes a physical connection with each of said plurality of modules for communication between said plurality of modules occurs.

7. The apparatus of claim 1 wherein modules are activated upon application of power thereto.

8. A system as set forth in claim 1 wherein said controller of at least said first module includes an address counter which is incremented upon each occurrence of said first module broadcasting address information in response to each address polling message from one of said plurality of modules, such that said first module provides unique address information to each of said plurality of modules.

9. A system as set forth in claim 1 wherein said controller of said first module includes a timer which is initialized upon each occurrence of broadcasting address information in response to an address polling message from said one of the other of said plurality of modules and, upon expiration of said timer, said first module broadcasting termination information to each of the other modules of said plurality of modules to terminate the addressing setting process.

10. A system as set forth in claim 1 wherein said memory storage device of each of said plurality of modules comprises a non-volatile memory device which stores internal address information for each respective said module of said plurality of modules.

11. A system for automatically addressing electronic modules comprising:

a first electronic module; and a second electronic module which has a power input for receiving electricity that powers the second module; wherein the first electronic module having an internal address which is set to a upon being activated, said first module being operable to broadcast address information having a value which is different from the first value, said first module further includes a switch element operable to electrically connect the power input of said second module with a source of electrical energy to thereby activate said second module; and the second electronic module electrically connected with said first module, said first module being operable to activate said second module, said second module including an internal address which said second module sets upon being activated and upon receiving address information broadcast by the first module, said second module being operable to broadcast a predetermined message which is received by said first module.

12. An apparatus as set forth in claim 11 wherein said predetermined message of said second module includes an address poll message which is broadcast by said second module upon being activated by said first module, said first module being operable to broadcast unique address information upon receiving the address poll message from said second module.

13. A system as set forth in claim 12 wherein said switch element of said first module being activated upon setting the internal address of said first module to the first value.

14. A system as set forth in claim 11 wherein said first module further includes a controller which is electrically connected with said second module by an electrical conductor which conducts an electrical signal from the first module to the second module to thereby effect a change in condition of said second module between active and inactive conditions.

15. A system as set forth in claim 14 wherein said controller of said first module supplies the electrical signal to said second module at a first voltage level to activate said second module and at a second voltage level, which is different from the first level, to deactivate said second module.

16. A system as set forth in claim 11 further including a third electronic module connected to said second module to define a sequence of interconnected modules which includes said first module, said second module and said third module, said second module being operable to activate said third module, said third module including an internal address which said third module sets upon being activated and upon receiving address information broadcast by said first module.

17. An apparatus as set forth in claim 16 wherein said third module, upon being activated by said second module, is operable to broadcast an address poll message, said first module being operable to broadcast unique address information in response to the address poll message of said third module.

18. An apparatus as set forth in claim 16 wherein said second module is operable to broadcast acknowledgement information upon receiving the address information broadcast by the first module, said first module being operable to broadcast unique address information upon receiving the acknowledgement information broadcast by said second module, said third module setting the internal address thereof to a value which is a function of the unique address information broadcast by said first module.

19. A system as set forth in claim 11 further including a common communications bus associated with each of said modules over which each of said modules may broadcast addressable messages for receipt by at least one other module.

20. A system as set forth in claim 19 wherein said communications bus comprises a physical connection with each of said modules for communication between said modules.

21. A system as set forth in claim 19 wherein said communications bus comprises a wireless communications medium for wireless communication between said modules.

22. A system as set forth in claim 19 wherein each of said first and second modules includes an interface connected with said communications bus for broadcasting and receiving messages respectively to and from said communications bus.

23. A system as set forth in claim 11 wherein each of said modules includes a non-volatile memory in which the internal address of each respective module may be stored.

24. A method for automatically addressing a plurality of serially connected electronic modules, each of the modules being operable to communicate over a common communications bus, said method comprising the steps of:

initializing a first module of the plurality of modules as a master module having a predetermined internal address, said initializing comprising (a) broadcasting an address request message from the first module of the plurality of modules over the communications bus, (b) setting an internal response timer upon broadcasting the address request message from the first module of the plurality of modules, and (c) if the internal response timer expires prior to receiving a response to the address request message, setting the first module of the plurality of modules as the master module having the predetermined internal address;

providing an activation signal from the first module to effect activation of an adjacent one module of the plurality of modules;

broadcasting address information from the first module over the communications bus, the address information being different from the predetermined internal address of the first module;

receiving the address information at the adjacent one module of the plurality of modules;

setting an internal address of the adjacent one module of the plurality of modules upon receiving the address information from the first module; and providing an activation signal from the adjacent one of the plurality of modules which is operable to activate a next adjacent module of the plurality of modules.

25. A method as set forth in claim 24 further including the step of broadcasting an address request message from the adjacent one module of the plurality of modules over the communications bus upon being activated by the first module of the plurality of modules, the first module broadcasting address information over the communications bus upon receiving the address request message from the adjacent one module of the plurality of modules.

26. A method as set forth in claim 25 further including the step of initializing a timer, which is part of the first module, upon each occurrence of broadcasting address information from the first module in response to an address request message from one module of said plurality of modules, such that, if the timer expires prior to receiving an address request message from another module of said plurality of modules, said first module broadcasting a termination message over the communications bus which instructs each of the other modules of the plurality of modules to terminate the addressing process.

27. A method as set forth in claim 24 wherein said method further includes the steps of providing electrical power to at least the first module of the plurality of modules and providing a predetermined voltage level to a first input of the first module of the plurality of modules to thereby activate the first module of the plurality of modules, the first module of the plurality of modules initializing as the master module in response to both (1) said step of providing the predetermined voltage level to the first input and (2) said step of providing electrical power to at least the first module.

28. A method as set forth in claim 27 wherein each of the other modules of the plurality of modules broadcasts an acknowledgement message over the communications bus upon being activated by an adjacent module and upon receiving address information from the first module of the plurality of modules, the first module of the plurality of modules broadcasting unique address information upon receiving an acknowledgment message from each of the other modules of the plurality of modules.

29. A method as set forth in claim 24 further including the steps of:

upon said step of broadcasting address information from the first module of the plurality of modules, setting a timer which is part of the first module of the plurality of modules; and if the timer expires prior to receiving an acknowledgement message in response to said step of broadcasting address information from the first module of said plurality of modules, broadcasting a termination message over the communications bus which instructs each module of the plurality of modules to terminate the addressing process.

30. A method as set forth in claim 24 further including the step of providing electrical power to each of the plurality of modules, which results in initializing the first module as the master module and in initializing each of the other modules of the plurality of modules as slave modules.

31. A method as set forth in claim 30 further including the steps of broadcasting a clear internal address message from the first module of the plurality of modules over the communications bus, the clear internal address message being received by the other modules of the plurality of modules and, upon receiving the clear address message from the first module of the plurality of modules, each of the other of the plurality of modules setting their respective internal addresses to a default value which is different from the predetermined internal address of the first module of the plurality of modules and which is indicative of a being a slave module.

32. A method for automatically addressing a plurality of serially connected electronic modules arranged in a sequence of modules which extends from a first module to a last module, each of the modules utilizing a common communications bus, said method comprising the steps of;

(a) activating the first module of the plurality of modules;
   (b) establishing the first module of the plurality of modules as a master module;
   (c) activating a next adjacent module in the sequence of modules by an activation signal provided from a preceding adjacent module in the sequence of modules;

(d) upon being activated, each next adjacent module broadcasting an address poll message over the communications bus;

(e) the first module of the plurality of modules broadcasting unique address information over the communications bus in response to receiving an address poll message from each next adjacent module;

(f) receiving the unique address information at the next adjacent module in the sequence of modules;

(g) setting an internal address of the next adjacent module in the sequence of modules upon receiving the unique address information; and (h) repeating steps (c) through (g) until each module of the plurality of modules has an internal address with a unique value.

33. A method as set forth in claim 32 wherein, if the first module of the plurality of modules does not receive an address poll message within a predetermined time period, said method further includes the step of broadcasting a termination message over the communications bus which instructs each module of the plurality of modules to terminate the addressing process.

34. A method as set forth in claim 32 wherein the next adjacent module in the sequence of modules broadcasts an acknowledgement message over the communications bus upon receiving the unique address information over the communications bus, the first module of the plurality of modules broadcasting unique address information in response to the acknowledgement message from the next adjacent module in the sequence of modules.

35. A method as set forth in claim 34 wherein upon the next adjacent module in the sequence of modules receiving the unique address information from the first module of the plurality of modules, the method further includes the step of providing an activation signal from the next adjacent module in the sequence of modules to a subsequent next adjacent module in the sequence of modules to thereby activate the subsequent next adjacent module in the sequence of modules.

36. A method as set forth in claim 34 wherein if no acknowledgement message is received within a predetermined time period from broadcasting the unique address information, the method further includes the step of broadcasting a termination message to the other modules of the plurality of modules over the communications bus which instructs the other modules of the plurality of modules to terminate the addressing process.

37. A method for addressing a plurality of serially connected electronic modules arranged in a predetermined sequence of modules; said method comprising the steps of:

activating one module of the plurality of modules in the sequence of modules;

setting an internal address of the one module to a default value;

broadcasting an address poll message to the other modules of the plurality of modules;

waiting for a response to the address poll message;

if no response to the address poll message is received, resetting the internal address of the one module in the sequence of modules to a first predetermined value;

if a response to the address poll message is received, resetting the internal address of the one module in the sequence of modules to a value which is a function of the response to the address poll message; and upon resetting the internal address of the one module in the sequence of modules, the one module electrically connecting a power input of the next adjacent module in the sequence of modules to an electrical power supply to thereby power the next adjacent module in the sequence of modules.

38. A method as set forth in claim 37 wherein said step of activating the one module in the sequence of modules further includes the step of receiving electrical power at the one module in the sequence of modules.

39. A method as set forth in claim 37 wherein, upon activation of a next adjacent module in the sequence of modules, the method further includes the steps of broadcasting an address poll message from the next adjacent module in the sequence of modules and, in response to the address poll message from the next adjacent module in the sequence of modules, broadcasting unique address information and incrementing an address counter of the one module in the sequence of modules.

40. A method as set forth in claim 39 wherein, upon broadcasting the unique address information, the method further includes the steps of initializing a first timer of the one module in the sequence of modules having the first predetermined value and, it the first timer expires before another address poll message is broadcast, broadcasting a termination message which instructs each module of said plurality of modules to end the addressing process.

41. A method as set forth in claim 34 further including the step of controlling a switch device, which is electrically connected with the source of electrical energy and part of the one module in the sequence of modules, to electrically connect the next adjacent module in the sequence of modules with the source of electrical energy to thereby effect activation of the next adjacent module in the sequence of modules.

* * * * *